United States Patent [19]

Igi et al.

[11] 4,335,188

[45] Jun. 15, 1982

[54] LAMINATES

[75] Inventors: Keishiro Igi, Kurashiki; Ishii Masao, Ibara, both of Japan

[73] Assignee: Kuraray Company, Limited, Kurashiki, Japan

[21] Appl. No.: 152,320

[22] Filed: May 22, 1980

[30] Foreign Application Priority Data

Jun. 7, 1979 [JP] Japan .................................. 54/71867

[51] Int. Cl.³ ............................................. B32B 15/08
[52] U.S. Cl. .................................... 428/458; 156/320; 156/322; 428/480; 428/481; 528/301; 528/302; 528/309
[58] Field of Search ................. 428/458, 480, 481, 43, 428/349; 528/301, 302, 309; 156/322, 320

[56]   References Cited
U.S. PATENT DOCUMENTS

| 3,013,914 | 12/1961 | Willard et al. | 528/301 |
| 3,515,630 | 6/1970 | Columbus | 156/332 |
| 4,062,907 | 12/1977 | Syblett | 528/301 |
| 4,094,721 | 6/1978 | Sturm et al. | 528/309 |
| 4,259,478 | 3/1981 | Jackson et al. | 528/309 |

Primary Examiner—George F. Lesmes
Assistant Examiner—E. Rollins Buffalow
Attorney, Agent, or Firm—Oblon, Fisher, Spivak, McClelland & Maier

[57]   ABSTRACT

Laminated structures consisting of two or more adherend members selected from a variety of materials such as metals and plastics bonded together with adhesive layers of hot melt adhesive of a polyester made from terephthalic acid or a dicarboxylic acid mixture containing at least 85 mole % of terephthalic acid, 0.65 to 0.97 mole per mole of terephthalic acid or dicarboxylic acid mixture of 1,4-butanediol or a polymethylene glycol mixture containing at least 80 mole % of 1,4-butanediol and 0.03 to 0.35 mole per mole of terephthalic acid or dicarboxylic acid mixture of polyethylene glycol having a molecular weight of 150 to 550, the total amount of the diol constituents being one mole per mole of said terephthalic acid or dicarboxylic acid mixture, and said polyester in the laminated structures having a crystallinity of not less than 25% and being substantially free from spherulites, can retain the high bonding strength of the adhesive for a prolonged period of time and at the same time are excellent in resistance to heat and hot water.

14 Claims, No Drawings

LAMINATES

BACKGROUND OF THE INVENTION

1. Field of the Invention

This invention relates to laminates made of layers bonded together with a hot melt adhesive comprising a linear polyester. More particularly, it relates to laminates made of layers bonded together with a hot melt adhesive containing a polyester made of terephthalic acid or a dicarboxylic acid mixture containing at least 85 mole % of terephthalic acid and 0.65 to 0.97 mole per mole of said terephthalic acid or dicarboxylic acid mixture of 1,4-butanediol or a polymethylene glycol mixture containing at least 80 mole % of 1,4-butanediol as well as 0.03 to 0.35 mole per mole of said terephthalic acid or dicarboxylic acid mixture of polyethylene glycol having a molecular weight of 150 to 550, the total amount of the diol constituents being one mole per mole of said terephthalic acid or dicarboxylic acid mixture, said adhesive in the laminates having a crystallinity of not less than 25% and being substantially free from spherulites.

DESCRIPTION OF THE PRIOR ART

In recent years, hot melt adhesives which can eliminate the use of solvents are used increasingly owing to a number of advantages such as the impossibility of environmental pollution and possibility of rapid adhesion. The most dominantly used hot melt adhesives are those consisting of ethylene-vinyl acetate copolymers. However, these adhesives are unsatisfactory with respect to heat resistance, and therefore hot melt adhesives having improved heat resistance are still being sought in many fields of use. In search of hot melt adhesives which may meet such requirements, polyester hot melt adhesives have been investigated intensively. Nevertheless, polyethylene terephthalate and polybutylene terephthalate, for example, which are widely used for making fibers, films, moldings and so on, are not satisfactory adhesives because they lack adequate flexibility, and crystallization after the hot melt adhesion process causes a decrease in bonding strength.

To overcome these problems, modified polyesters, namely polyesters that are prepared by incorporating an aliphatic dicarboxylic acid and/or a glycol other than ethylene glycol or butylene glycol as comonomer into polyethylene terephthalate or polybutylene terephthalate, for instance, have been proposed in Japanese Patent Publication No. 6019/1969, Japanese Patent Publication No. 1559/1970 (which corresponds to U.S. Pat. No. 3,329,740), U.S. Pat. No. 3,515,628, Japanese Patent Publication No. 19454/1976, Japanese patent application Laid-Open Nos. 8831/1975, 37129/1976 and 37933/1976, and so on. However, these copolyesters have such drawbacks as insufficient resistance to heat and hot water and low tensile shear bond strength as adhesives.

Copolyesters prepared by incorporating polyoxyalkylene glycols such as polyethylene glycol or polytetramethylene glycol into polyethylene terephthalate or polybutylene terephthalate, for instance, have also been proposed, for example, in U.S. Pat. No. 3,013,914, Japanese Patent Publication No. 16146/1973, Japanese patent application Laid-Open Nos. 160344/1975, 125431/1976, 19731/1977, 14742/1978, 26835/1978 and 71138/1978. These copolyesters are also unsatisfactory as adhesives with respect to tensile shear bond strength. Nothing is mentioned of physical and chemical bonding properties which can lead to adequate adhesive performance.

SUMMARY OF THE INVENTION

It is an object of the invention to provide adhesive layers which have high bond strength (peel strength and tensile shear strength) in laminates formed by bonding layers of materials such as metals, plastics, ceramics, wood, paper and fibers. Another object is to provide adhesive layers which hold their initial bond strength over a long period of time without any substantial decrease. A further object is to provide adhesive layers highly resistant to hot water.

The adhesive layers in the laminated structures of the invention contain hot melt adhesives which comprise polyesters made from terephthalic acid or a dicarboxylic acid mixture containing at least 85 mole % of terephthalic acid and 0.65 to 0.97 mole per mole of said terephthalic acid or dicarboxylic acid mixture of 1,4-butanediol or a mixture of polymethylene glycol containing at least 80 mole % of 1,4-butanediol as well as 0.03 to 0.35 mole per mole of said terephthalic acid or dicarboxylic acid mixture of polyethylene glycol having a molecular weight of 150 to 550, the total amount of the diol constituents being one mole per mole of said terephthalic acid or dicarboxylic acid mixture. The polyesters are required to have a crystallinity of not less than 25% and be substantially free from spherulites.

DETAILED DESCRIPTION OF THE INVENTION

The dicarboxylic acid component of the linear polyester to be used as the adhesive in the laminates of the present invention is terephthalic acid or a dicarboxylic acid mixture containing at least 85 mole % of terephthalic acid. The purpose is to secure resistance of the laminates to heat and water (hot water), and terephthalic acid is essential for this purpose. However, the acid can be replaced to an extent of not more than 15 mole % by at least one aromatic dicarboxylic acids such as isophthalic acid, 1,2-bis(p-carboxyphenoxy)ethane, and 2,2-bis(p-carboxyphenyl)propane and aliphatic dicarboxylic acids such as succinic, adipic and sebacic acids. These copolymerizable dicarboxylic acid constituents are used in amounts which do not decrease the melting point and crystallinity of the polyester too much, and they can be used as comonomers when an increase in peel bond strength is desirable even at the cost of a slight decrease in tensile shear bond strength. From this viewpoint, the amount of acid comonomer is required to be zero or at most 15 mole %, preferably zero or at most 10 mole %. Excessively large comonomer amounts are undesirable because the tensile shear bond strength is decreased, the peel bond strength is no longer improved, the rate of solidification at the time of cooling the molten polymer in the hot melt adhesion process is decreased making it difficult to attain rapid, short-time adhesion, which is one of the advantages of hot melt adhesives, and the resistance of the adhesives to heat and water (hot water) is markedly lowered.

The diol component of the polyester as the adhesive in the laminates of the present invention comprises on the one hand 1,4-butanediol with or without at most 20 mole % of at least one of polymethylene glycols other than 1,4-butanediol and on the other polyethylene glycol having a molecular weight of 150 to 550. 1,4-

Butanediol as the first diol member is essential. With polymethylene glycols other than 1,4-butanediol, various problems are encountered. These problems include insufficient bonding power resulting from various causes including thermal decomposition of the polymers at the time of melting because of high melting points of the polyesters obtained; insufficient tensile shear bond strength or peel bond strength; a decrease in bond strength due to postcrystallization; or, in some cases inferior heat and water (hot water) resistance due to a lowering of the melting points of the polyesters. When 1,4-butanediol is used as the first diol member combined with a specific polyethylene glycol as the second diol member, good lamination and adhesion is possible without any of these drawbacks, and moreover high-speed adhesion process is possible presumably because the rate of crystallization of the polyester is high. A part of the 1,4-butanediol can be replaced by one or more other polymethylene glycols, the amount of which is at most 20 mole %, preferably at most 15 mole %. Such other polymethylene glycols are glycols containing 2 to 10 carbon atoms, except 1,4-butanediol, and, from the viewpoint of crystallinity of the polyester, 1,6-hexanediol is especially preferred. Branched alkylene glycols such as neopentyl glycol may also be used as comonomers, if present in small amounts.

Another essential member of the diol component of the polyesters in the present invention is polyethylene glycol having a molecular weight of 150 to 550. Although polyethylene glycol species of various molecular weights can be copolymerized, a high degree of bond strength can be attained only when the molecular weight is in the range specified above at the same time, the amount of the polyethylene glycol must be in a specific range, as mentioned below. Molecular weights exceeding the limit are unfavorable with respect to bonding power. Molecular weights of 150 to 400 are especially preferred. The polyethylene glycol having a molecular weight of 150 corresponds to triethylene glycol. With an increase of molecular weights, it becomes more and more difficult to obtain polyethylene glycol consisting of a component with a single molecular weight. In those cases, a substantial part of the polyethylene glycol falls within the above range. Polypropylene glycol and polytetramethylene glycol, which are copolymerizable analogs of polyethylene glycol are inadequate because of inferior bonding power. The diol component of the polyesters in the present invention comprises, per mole of the acid component, 0.03 to 0.35 mole of polyethylene glycol having a molecular weight of 150 to 550 and 0.65 to 0.97 mole of 1,4-butanediol or a mixture of 1,4-butanediol and not more than 20 mole % of at least one polymethylene glycol other than 1,4-butanediol. Smaller amounts of polyethylene glycol result in decreased peel bond strength and cause postcrystallization, which leads to a progressive decrease in bond strength due to crystallization of the polyester occurring after adhesion. With excessively large amounts of polyethylene glycol, the bond strength is low; the rate of solidification when the molten polyester is cooled in the adhesion process is reduced, preventing thereby high-speed, quick adhesion; and the heat and water (hot water) resistance is inferior. An especially preferred range of the amount of polyethylene glycol is from 0.05 to 0.2 mole.

The polyesters in the present invention have melting points in the range of from 160° C. to 210° C. depending on the polymer compositions. The polyesters may contain the catalysts and/or stabilizers that were used at the time of polymerization. Examples are compounds of elements such as Ti, Zr, Zn, Ca, Mg, Sb, Sn, Ge and P. The polymerization degree of each polyester is desirably sufficiently high that the intrinsic viscosity as measured at 30° C. in a mixed solvent consisting of phenol and tetrachloroethane (1:1 by weight) is not less than about 0.5, preferably not less than 0.6.

The polyesters useful in the present invention may contain, for the purpose of making them suitable for their use as hot melt adhesives, appropriate amounts of antioxidants, in particular phenolic antioxidants such as 2,6-di-tert-butyl-p-cresol and 2,2'-methylene-bis(4-methyl-6-tert-butylphenol), agents for providing electroconductivity such as powdered metals and carbon, metal oxides for enabling melting by dielectric heating such as iron oxides, various pigments such as titanium oxide, various polymers for adjusting the viscosity of the molten mass or as fillers such as polyolefins, polyamides and polycarbonates, and so forth. The polyesters in the present invention are used in laminations such as films, sheets, fibers, strings, chips, and powders.

The laminates of the present invention are composed of combinations of sheets or films of the same or different kinds of metals, plastics, fibers, wood, paper, ceramics and other materials. Excellent effects can be produced especially in laminating metal sheets. The metal surface may be chemically treated or covered with an under coat. Many kinds of resins are known as suitable coating agents for the metal surface. Some examples are epoxy resin, phenolic resin, epoxy-phenolic resin aminoplasts, alkyd resin and special vinyl polymers. These are applied to the metal surface as coatings before the lamination step. In the case of metal lamination, epoxy, epoxy-phenolic and phenolic coat are especially preferable, because of the increased bond strength and hot water resistance of the adhesive layer and interface.

The laminates of the present invention are produced by any known lamination methods. In one lamination technique, a film of adhesive is inserted between layers to be bonded together, the whole is pressed with heating and, after the adhesive has been melted, cooled to solidify the adhesive. It is necessary to select relatively high rates of cooling so that the adhesive remains substantially free from spherulites and at the same time has a crystallinity of not less than 25%. At lower rates of cooling, spherulites are formed and good bonding power can not be obtained. At excessively high rates of cooling, low degrees of crystallinity result, which may lead to postcrystallization, although spherulite formation does not occur. In another example of the lamination technique, the adhesive is preliminarily bonded to one of the layers to be bonded together prior to practicing the above-mentioned technique. In a further example, the molten polyester is applied continuously between two adherend layers being continuously supplied, the whole is then cooled under pressure between a pair of rolls to complete adhesion and the laminate is taken up.

The crystallinity in the present invention can be determined by known methods, such as by X-ray diffractometry or by measuring the heat of fusion of crystals by differential thermal analysis (DTA) or differential scanning calorimetry (DSC). The crystallinity should be not less than 25% but is not required to be more than 45–50%. In practice, a crystallinity of 50% or above is very difficult to achieve with the polyesters and accordingly is unrealistic. A crystallinity of 20% or below is unfavorable because the bond strength decreases with time due to postcrystallization. The phrase "free from spherulites" as used hereinbefore corresponds to the condition that the adhesive is transparent when observed under visible light by the naked eye. It also corresponds to the condition that brilliant spherical crystal cannot be observed under an optical polarization microscope with crossed nicol prisms. The presence of a very small amount of spherulites exerts an influence on the initial bond strength only to an extent falling within the error range, and accordingly is permissible. Almost all the cristillinity obtained should be due to the fine crystallites that are undetectable by the naked eyes or optical microscope. Whether the polyester is substantially free from spherulites in the laminates can be judged, in the case of a steel sheet laminate, for instance, by immersing the laminate in diluted hydrochloric acid to cause dissolution and removal of the steel sheets followed by observation of the remaining adhesive layer. The lamination free from spherulites can be achieved by employing a relatively high rate of cooling in the step of developing bond strength by cooling and solidifying the melted polyester. When the rate of cooling is too slow, spherulites are formed. High cooling rates are advantageous because the polyester solidifies before spherulites can grow. Since the formation and growth of spherulites depend upon the composition of the polyester, the molding technique and other previous history, it is not possible to specify the rate of cooling specifically. Nevertheless, in an embodiment given by way of example, lamination of thin steel sheets can be achieved when two steel sheets with a film of the polyester inserted therebetween are heated on a hot press at about 230° C. and, after the polyester is melted, the whole is immediately cooled by immersing the same in a water bath at room temperature or below. In this way, lamination and adhesion substantially free from spherulites can be achieved. Generally, a rate of cooling by 100° C. over several milliseconds to several seconds may be selected as a standard rate. Although polyethylene terephthalate and polybutylene terephthalate can also be used for lamination and adhesion by employing such high rates of cooling, the bond strengths are disadvantageously decreased with time due to postcrystallization of the adhesive layer. On the contrary, the present invention has removed such drawbacks. Thus, in the case of the adhesives of the present invention, high-speed, quick adhesion is possible and the adhesion obtained is very desirable.

As described hereinbefore, laminates having adhesive layers resistant to heat and hot water, high in initial bond strength and showing no substantial tendency toward decrease thereof with time can be obtained by using polyesters that have the particular compositions specified by the present invention, and carrying out the adhesion process is such a manner that the adhesion is substantially free from spherulites and has a crystallinity of not less than 25%. In the case of the previously mentioned laminate of thin steel sheets, for instance, the present invention provides high degrees of initial bond strength, namely a tensile shear bond strength of about 150 Kg/cm² or more and a T-peel bond strength of 4–5 Kg/25 mm or more, and the laminate does not undergo any decrease in bond strength even after a long period of storage or after immersion in hot water.

The adhesives of the invention find use in lamination of metal sheets, lamination and adhesion of joints in containers or receptacles made of metal sheets, manufacture of retort pouches by laminating a metal foil and a plastic film, manufacture of water-resistant paper wares by laminating a metal foil and a paperboard, manufacture of refractory composite boards by laminating a metal sheet and a wood board, and so forth.

The following examples will illustrate the invention in more detail.

EXAMPLES 1 TO 8 AND COMPARATIVE EXAMPLES 1 TO 14

A glass flask was charged with corresponding amounts of dimethyl terephthalate, 1,4-butanediol and polyethylene glycol together with tetra-n-butyl titanate as catalyst in an amount of 0.03% by weight based on the dimethyl terephthalate, and the contents were heated at 200° C. with stirring. While removing the methanol formed from the system continuously, the reaction was allowed to proceed for 90 minutes and then the temperature was raised to 260° C. and the polymerization was allowed to proceed under a reduced pressure of 0.2 to 0.6 mm Hg (absolute pressure) for 1 to 2 hours. In this manner, polyesters having an intrinsic viscosity value of 0.8 to 1.1 (dl/g) were obtained. Each polyester sample was pulverized and inserted between two sheets of polytetrafluoroethylene (Teflon), and the whole was pressed with heating by means of a hot press maintained at a temperature higher than the melting point of the polyester by 20° to 30° C. and then cooled, to give a film of the polyester having a thickness of about 120 microns. Separately, for the bond strength tests according to JIS (Japanese Industrial Standard)-K-6848-1976, JIS-K-6850-1976 and JIS-K-6854-1973, sheet metal pieces as specified in the standards were prepared, the polyester film was inserted between two of the sheet metal pieces, and the whole was placed between two larger metal sheets for pressing the same and pressed with heating on a hot press maintained at a temperature higher than the melting point of the polyester by 40° C. Thirty seconds after the melting of the polyester, the laminate was taken out and immersed in water at a temperature of 1° to 32° C. to complete lamination and adhesion. The adhesive layer thickness was adjusted to 100 microns by the use of spacer elements. After wiping off the water, the test piece was air-dried in the test room for 2 days, then conditioned with respect to humidity and submitted to the bond strength tests. The measurements were performed under conditions of 20°±5° C. and 65±20% RH (relative humidity). The analysis for polyester composition was made by $H^1$-NMR (proton nuclear magnetic resonance) and gas chromatography with a product of decomposition with ethanol. In all of Examples 1 to 8, the adhesive layer was transparent and free from spherulites and had a crystallinity in the range of 29 to 34%. The bond strength values for the respective adhesives are shown in Table 1 together with those for Comparative Examples 1 to 14. It is evident from the data in Table 1 that the laminates of the present invention have higher values both for the tensile shear bond strength and for the peel bond strength.

TABLE 1

| Example | Polyalkylene glycol Kind* | Mol. wt. | Molar fraction** | Tensile shear bond strength (Kg/cm$^2$) Stainless Steel | Steel | Aluminum | T-peel bond strength (Kg/25 mm) Steel | Aluminum |
|---|---|---|---|---|---|---|---|---|
| Compar. 1 | — | — | — | 95 | 110 | 112 | 2.7 | 1.4 |
| Compar. 2 | PEG | 106 | 0.09 | 85 | 100 | 85 | 2.5 | 1.7 |
| Compar. 3 | " | " | 0.22 | 83 | 71 | 80 | 3.2 | 2.0 |
| Compar. 4 | " | " | 0.51 | 77 | 80 | 83 | 2.9 | 2.3 |
| Example 1 | " | 150 | 0.06 | 147 | 163 | 177 | 4.2 | 3.7 |
| Example 2 | " | " | 0.10 | 167 | 174 | 180 | 4.7 | 4.2 |
| Example 3 | " | " | 0.19 | 170 | 188 | 175 | 5.4 | 4.0 |
| Compar. 5 | " | " | 0.48 | 90 | 112 | 90 | 5.0 | 3.0 |
| Example 4 | " | 200 | 0.21 | 187 | 180 | 173 | 4.8 | 3.7 |
| Example 5 | " | 300 | 0.10 | 171 | 175 | 182 | 4.9 | 3.5 |
| Example 6 | " | " | 0.22 | 172 | 170 | 181 | 5.2 | 3.9 |
| Example 7 | " | 400 | 0.10 | 158 | 161 | 167 | 4.3 | 3.8 |
| Example 8 | " | " | 0.18 | 153 | 172 | 166 | 5.8 | 4.0 |
| Compar. 6 | " | 600 | 0.11 | 94 | 107 | 101 | 4.5 | 3.5 |
| Compar. 7 | " | 1000 | 0.05 | 87 | 93 | 97 | 4.7 | 3.0 |
| Compar. 8 | " | 2000 | 0.025 | 79 | 80 | 78 | 5.0 | 3.2 |
| Compar. 9 | PPG | 2136 | 0.17 | 81 | 80 | 72 | 2.0 | 2.0 |
| Compar. 10 | " | 400 | 0.19 | 77 | 82 | 80 | 2.7 | 1.5 |
| Compar. 11 | " | 1000 | 0.05 | 75 | 80 | 72 | 2.7 | 1.7 |
| Compar. 12 | PTMG | 650 | 0.11 | 88 | 100 | 93 | 2.8 | 2.1 |
| Compar. 13 | " | 1000 | 0.05 | 102 | 108 | 107 | 2.5 | 2.0 |
| Compar. 14 | " | 2000 | 0.025 | 80 | 113 | 105 | 2.3 | 1.8 |

Notes:
*PEG denotes polyethylene glycol, PPG polypropylene glycol and PTMG polytetramethylene glycol.
**1,4-Butanediol makes up the balance.

EXAMPLES 9 & 10 AND COMPARATIVE laminates to stand at room temperature or in hot water are summarized in Table 2.

TABLE 2

| Example | Polymer | Spherulites | Crystallinity | Tensile shear bond strength Initial | After 3 weeks at room temp. | After 1 hour in water at 90° |
|---|---|---|---|---|---|---|
| Example 9 | A | Absent | 33% | 178 Kg/cm$^2$ | 173 Kg/cm$^2$ | 175 Kg/cm$^2$ |
| Compar. 15 | A | Absent | 17 | 164 | 82 | 47 |
| Compar. 16 | A | Present | 32 | 33 | —* | — |
| Example 10 | B | Absent | 31 | 170 | 165 | 171 |
| Compar. 17 | B | Present | 33 | 20 | — | — |
| Compar. 18 | PET | Absent | 0 | 110 | 53 | 10 |
| Compar. 19 | " | Present | 18 | 25 | — | — |
| Compar. 20 | PBT | Absent | 30 | 126 | 44 | 20 |
| Compar. 21 | " | Present | 35 | 30 | — | — |
| Compar. 22 | PBHT | Absent | 23 | 120 | 85 | 68 |

*indicates zero or nearly zero

EXAMPLES 15-22

Two kinds of polybutylene terephthalate modified by incorporating into the diol component polyethylene glycol having a molecular weight of 300 at molar fractions of 0.06 and 0.13, respectively (abbreviated to Polymer A and Polymer B), and polyethylene terephthalate (PET) for comparison, polybutylene terephthalate (PBT) for comparison and polybutylene hexahydroterephthalate (PBHT) for comparison were used in laminating cold-rolled steel sheets having chemically treated surfaces. The lamination procedure as described in Example 1 was followed except that the laminates were cooled during the adhesion process by allowing them to stand, causing gradual cooling, immersing them in water, or immersing them in a dry ice-methanol bath, causing ultrarapid cooling. The presence or absence of spherulites in the adhesive layer as well as the crystallinity and bond strength data before and after allowing the As is clear from the data in Table 2, the laminates of the present invention had high bond strength values and no substantial decreases in bond strength with time. A test piece prepared in Example 9 by the same procedure was submitted to the relevant test after 90 days of storing at room temperature; a substantial decrease in bond strength was not observed.

EXAMPLES 11 & 12 AND COMPARATIVE EXAMPLES 23 & 24

Using dimethyl terephthalate, 1,4-butanediol (BD), 1,6-hexanediol (HD) and polyethylene glycol (molecular weight: 300) and proceeding as in Example 5, polyesters were prepared and used in the lamination and adhesion tests. The results are summarized in Table 3 together with the results for Comparative Examples 23 and 24.

TABLE 3

| Example | Polymethylene glycol Kind | Polymethylene glycol Molar fraction | Polyethylene glycol Mol. wt. | Polyethylene glycol Molar fraction | Tensile shear bond strength (Kg/cm$^2$) Steel | Tensile shear bond strength (Kg/cm$^2$) Aluminum | T-peel bond strength (Kg/25 mm) Steel | T-peel bond strength (Kg/25 mm) Aluminum |
| --- | --- | --- | --- | --- | --- | --- | --- | --- |
| Example 11 | BD | 0.73 | 300 | 0.19 | 181 | 172 | 5.6 | 4.0 |
|  | HD | 0.08 |  |  |  |  |  |  |
| Example 12 | BD | 0.79 | 300 | 0.11 | 185 | 166 | 5.5 | 4.0 |
|  | HD | 0.10 |  |  |  |  |  |  |
| Compar. 23 | HD | 1.00 | — | — | 101 | 120 | 3.1 | 1.6 |
| Compar. 24 | BD | 0.90 | — | — | 95 | 90 | 2.8 | 1.7 |
|  | HD | 0.10 |  |  |  |  |  |  |

It is evident in Table 3 how high the adhesive joint strength in the laminates of the present invention is. The bond strength measured 90 days after the adhesion for the laminate of Example 12 did not reveal any substantial decrease.

EXAMPLE 13 AND COMPARATIVE EXAMPLE 25

The procedure of Example 5 was followed except that 10 mole % of the dimethyl terephthalate was replaced by dimethyl adipate. The steel sheet laminates thus obtained were tested for tensile shear bond strength and T-peel bond strength; the results were 167 Kg/cm$^2$ and 5.2 Kg/25 mm, respectively. For comparison, the same test for peel bond strength was conducted with a corresponding polyester in which 20 mole % of the dimethyl terephthalate was replaced by dimethyl adipate: the result was 5.7 Kg/25 mm.

EXAMPLE 14

A thin epoxy phenolic resin coat was formed on the surface of steel sheets by applying an epoxy phenolic resin to said surface and curing the resin with heating. The coated steel sheets surfaces were bonded together in the same manner as in Example 5 by means of the same copolyester as used in Example 5. The tensile shear bond strength of the resulting laminate was 215 Kg/cm$^2$ and the T-peel bond strength 15.7 Kg/25 mm. The correspondiang bond strength values after storage at room temperature for 90 days were 208 Kg/cm$^2$ and 16.0 Kg/25 mm, respectively.

EXAMPLE 15

Chemically treated steel sheets were coated with an epoxy phenolic resin. Using the coated steel, the procedure of Example 12 was followed for adhesion and lamination. The tensile shear bond strength of the resulting laminate was 204 Kg/cm$^2$ and the T-peel bond strength 18.2 Kg/25 mm. The corresponding bond strength values after 90 days of storage at room temperature were 210 Kg/cm$^2$ and 18.0 Kg/25 mm, respectively. The values after immersion in hot water at 95° C. for an hour were 201 Kg/cm$^2$ and 17.7 Kg/25 mm, respectively.

What is claimed is:

1. A laminated structure comprising at least two adherends bonded together with a polyester made from terephthalic acid or a dicarboxylic acid mixture containing at least 85 mole % of terephthalic acid, 0.65 to 0.97 mole per mole of said terephthalic acid or dicarboxylic acid mixture of 1,4-butanediol or a polymethylene glycol mixture containing at least 80 mole % of 1,4-butanediol and 0.030 to 0.35 mole per mole of said terephthalic acid or dicarboxylic acid mixture of polyethylene glycol having a molecular weight of 150 to 550, the total amount of the diol constituents being one mole per mole of said terephthalic acid or dicarboxylic acid mixture, said polyester having a crystallinity of not less than 25% and being substantially free from spherulites.

2. The laminated structure of claim 1, wherein the adherends are made of at least one material selected from the group consisting of metals, plastics, ceramics, wood, paper and fibers.

3. The laminated structure of claim 1, wherein the polyester consists essentially of terephthalic acid, 1,4-butanediol and polyethylene glycol.

4. The laminated structure of claim 1, wherein the polyester consists essentially of terephthalic acid, 1,4-butanediol, 1,6-hexanediol and polyethylene glycol.

5. The laminated structure of claim 1, wherein said dicarboxylic acid mixture contains at least 85 mole % of terephthalic acid and not more than 15 mole % of additional dicarboxylic acid selected from the group consisting of aromatic dicarboxylic acid and aliphatic dicarboxylic acid.

6. The laminated structure of claim 5, wherein said aromatic dicarboxylic acid is selected from the group consisting of isophthalic acid, 1,2-bis (p-carboxyphenoxy) ethane and 2,2-bis (p-carboxyphenyl) propane.

7. The laminated structure of claim 5, wherein said aliphatic dicarboxylic acid is selected from the group consisting of succinic acid, adipic acid and sebacic acid.

8. The laminated structure of claim 1, wherein said polymethylene glycol mixture contains at least 80 mole % of 1,4 butanediol and at most 20 mole % of additional polymethylene glycol selected from the group consisting of glycols having 2–10 carbon atoms.

9. The laminated structure of claim 8, wherein said polymethylene glycol of 2–10 carbon atoms is 1,6-hexanediol.

10. The laminated structure of claim 1, wherein said polyethylene glycol has a molecular weight of 150 to 400.

11. The laminated structure of claim 1, wherein said polyethylene glycol is present in an amount of 0.05 to 0.2 mole per mole of said terephthalic acid or dicarboxylic acid mixture.

12. The laminated structure of claim 8, wherein said polymethylene glycol mixture contains at most 15 mole % of said additional polymethylene glycol.

13. The laminated structure of claim 8, wherein said polymethylene glycol mixture contains at most 10 mole % of said additional polymethylene glycol.

14. The laminated structure of claim 5, wherein said dicarboxylic acid mixture contains not more than 10 mole % of said additional dicarboxylic acid.

* * * * *